May 19, 1970
W. R. HELSOP
3,513,429
HEAT RECOVERABLE ACTUATOR
Filed Oct. 30, 1968
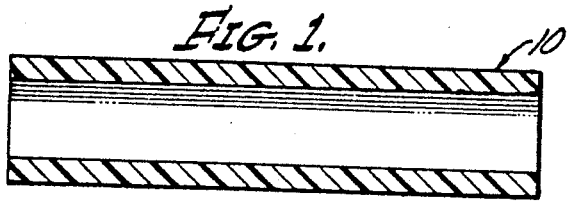
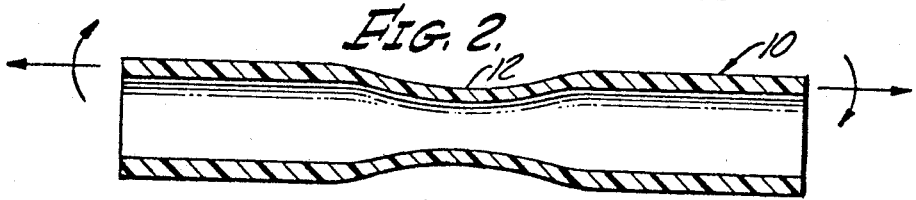
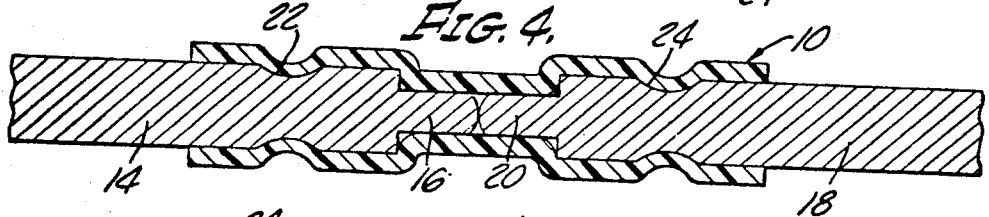
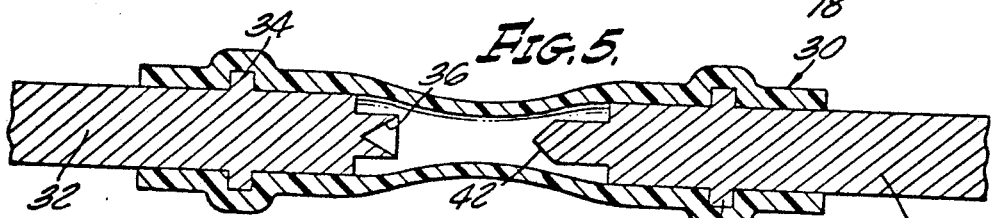
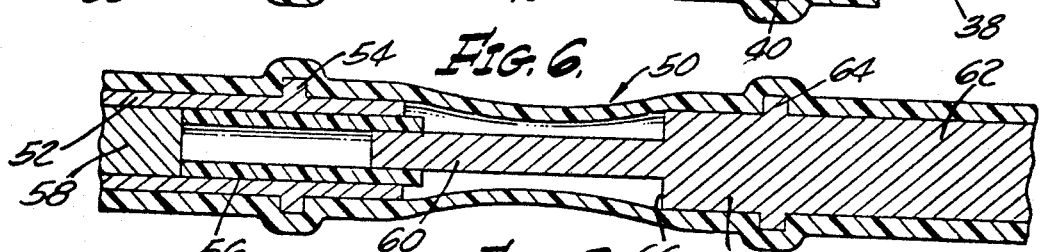
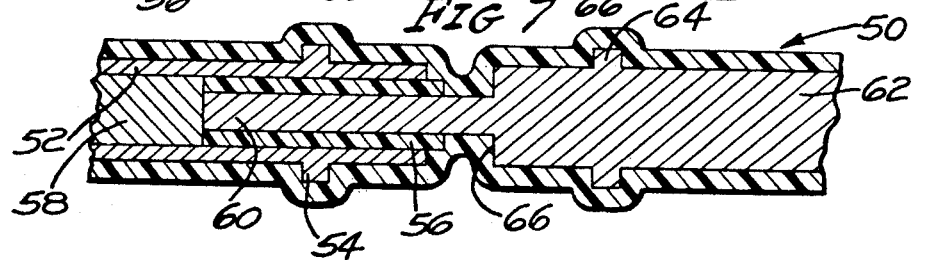

United States Patent Office 3,513,429
Patented May 19, 1970

3,513,429
HEAT RECOVERABLE ACTUATOR
William Rosse Helsop, Atherton, Calif., assignor to Raychem Corporation, Menlo Park, Calif., a corporation of California
Continuation-in-part of application Ser. No. 591,915, Nov. 3, 1966. This application Oct. 30, 1968, Ser. No. 771,809
Claims priority, application Australia, Oct. 30, 1967, 29,136/67
Int. Cl. H01h 37/46; H02g 15/08
U.S. Cl. 337—382                                    22 Claims

ABSTRACT OF THE DISCLOSURE

This disclosure describes an actuator comprising a longitudinally expanded heat recoverable member containing two contact members. Upon the application of heat, the heat recoverable member changes in length causing the contact members to be brought toward one another. The heat recoverable member may also be rotationally expanded as well as being longitudinally expanded.

---

This application is a continuation-in-part of my copending application Ser. No. 591,915 which was filed on Nov. 3, 1966 and entitled "Heat Recoverable Actuator," which has been expressly abandoned.

BACKGROUND OF THE INVENTION

This invention relates to an actuator and more particularly relates to an actuator in which relative movement of a plurality of members is caused by the shrinkage of a heat recoverable member.

In my U.S. patent application entitled "Heat Recoverable Article With Mechanical Insert" Ser. No. 591,836 filed Nov. 3, 1966 and in the U.S. patent application filed by Judson Douglas Wetmore entitled "Heat Recoverable Article With Mechanical Insert" Ser. No. 591,914 filed Nov. 3, 1966, there are disclosed several types of novel devices useful for making mechanical connections. In these applications, the disclosures of which are incorporated by reference herein, a mechanical insert having a mechanical advantage is positioned within an independently dimensionally heat unstable member such as a sleeve. While such a sleeve when recovered over objects to be connected or engaged exerts a considerable force, the mechanical inserts of the said applications permit this force to be increased and the connection or engagement consequently improved. These inserts, for example, may be of the type utilizing the principle of a lever or they may take various other forms and may operate in such a manner that the forces transmitted from the recovery of the sleeve to the object to be acted on are exerted on the object in a direction other than the direction of movement of the sleeve as it recovers.

In general, such heat recoverable members or sleeves are made of a material capable of having the property of plastic or elastic memory imparted thereto and are expanded under heat and pressure to a diameter greater than their normal diameter and cooled while under pressure. A sleeve treated in this manner will retain its expanded position until it is again heated to at least its heat recovery temperature at which time it will recover to its original shape. Examples of material useful in forming such dimensionally heat unstable recoverable members may be found in Currie Pat. No. 2,027,962 and Cook et al. Pat. No. 3,086,242, the disclosures of which are incorporated herein by reference. Polymeric materials which have been crosslinked by chemical means or by irradiation, for example, with high energy electrons or nuclear radiation, such as those disclosed in the Cook et. al. patent, are preferred for use in the present invention. Noncrystalline polymeric materials exhibiting the property of plastic or elastic memory, such as polyurethane, ionomers, etc., could also be used in practicing the present invention. Sleeves made from materials having either plastic or elastic memory are equally useful in the actuators of the present invention; consequently, as used herein, the terms "elastic memory" and "plastic memory" are used interchangeably and are intended to be mutually inclusive.

Alternatively, metals having the property of heat recoverability may be used in place of or in combination with the foregoing heat recoverable organic materials. Suitable heat recoverable materials for use in this invention are described in Muldawer et al. Pat. No. 3,012,882 and Buehler et al. Pat. No. 3,174,851, and Buehler et al. "Martensitic Transformations in the TiNi Compound," a paper given at the Fifth International Symposium on the reactivity of solids, Munich, Germany, Aug. 5–8, 1964, reprinted in Reactivity of Solids, pp. 79–90 (Elsevier Publishing Company, Amsterdam, 1965), the disclosures of the patents are incorporated by reference herein and the following portions of the Buehler et al. are hereby incorporated.

EXPERIMENTAL

Alloy preparation

The alloy specimens investigated in this paper were prepared by non-consumable arc melting. A stable arc for melting was maintained by the use of a partial atmosphere of dry argon gas. Several remelts were performed on each alloy to insure chemical homogeneity. Except where noted, the alloys were prepared from Mond nickel shot (99.9+% Ni determined by spectrographic analysis) and Du Pont high purity titanium sponge (approximately 80 Brinnel hardness number).

Processing the alloys near composition TiNi into suitable wrought forms was readily accomplished. Hot working was performed in an air atmosphere in the temperature range from 650°–1000° C., with a preferred finishing temperature closer to 700° C. At the hot working temperatures, a surface oxide containing a high percentage of $TiO_2$ formed with the initial heating and remained tightly adherent throughout hot working. Removal of the coating was accomplished by chemical or mechanical means. Cold working, at room temperature, was also possible for the TiNi material but frequent stress relief anneals were required.

Dilation studies

In order to study the dimensional changes described above in a quantitative manner, a carefully controlled dilation study was performed. This study consisted of dividing a hot swaged specimen 50 at percent Ni rod into two half-length rods. One half-length rod specimen was cold worked by swaging, introducing predominantly compressive stresses. The other half-length rod specimen was cold drawn through wire drawing dies, introducing mainly tensile stresses. In each case, the rods were given about an 8% reduction in cross sectional area at room temperature by two different modes of deformation. FIG. 5 shows the marked change in dimensions that occurred in the standard 50 mm. long dilation specimens when heated to the vicinity of 300° C. The most significant effect was the drastically different dimensional changes that occurred. Expansion taking place in the cold swaged specimen while contraction of similar magnitude occurred in the cold drawn specimen with heating.

It has been found that such independently dimensionally unstable sleeves or members are useful in themselves for making a connection or engagement between a pair of objects without the need for an intermediate mechanical insert. In the aforesaid applications, the diametric shrinking of such heat recoverable sleeves or members are employed. According to the present invention, actuators are provided that take advantage of the longitudinal and/or rotational recovery of the member or sleeve to exert forces on objects that draw them together. An actuator of this type can be used for many purposes, for example, to open or close a valve or open and close an electrical circuit. The devices of the present invention can also be used when it is desired to quickly and selectively complete one of a plurality of electrical circuits or to complete them all simultaneously.

It is therefore an object of the present invention to provide an actuator including a recoverable article.

It is also an object of the present invention to provide such an actuator in which the longitudinal and/or rotational recovery forces of a heat recoverable sleeve are used to move two objects relative to each other.

It is another object of the present invention to provide such an actuator that operates to close an electrical circuit and eliminates the need for dissimilar, i.e., male and female, contacts.

It is a further object of the present invention to provide such an actuator for closing an electrical circuit wherein the contact members are wiped clean against one another.

These and other objects and advantages of the present invention will become more apparent upon reference to the accompanying description and drawings in which:

BRIEF DESCRIPTION OF THE DRAWINGS

FIG. 1 is a cross-sectional view of a diametrically expanded heat recoverable sleeve;

FIG. 2 is a cross-sectional view of the sleeve of FIG. 1 after additional longitudinal and/or rotational expansion;

FIG. 3 is a cross-sectional view of an actuator according to the present invention utilizing the sleeve of FIG. 2;

FIG. 4 is a cross-sectional view of the actuator of FIG. 3 after the sleeve has been recovered;

FIG. 5 is a cross-sectional view of another actuator according to the present invention utilizing the sleeve of FIG. 2;

FIG. 6 is a cross-sectional view of a third actuator according to the present invention utilizing the sleeve of FIG. 2;

FIG. 7 is a cross-sectional view of the actuator of FIG. 6 after the actuation thereof, that is, after the sleeve has been recovered.

DESCRIPTION OF THE INVENTION

Turning now to FIG. 1, there is shown a heat recoverable member or sleeve 10 that has been expanded from its original size and shape in any suitable manner, preferably in the manner disclosed in the aforementioned Cook et al. patent. FIG. 2 shows the same sleeve 10 after it has been subjected to additional longitudinal and/or rotational expansion as indicated by the arrows. In many cases, only longitudinal expansion is necessary while in others the rotational expansion is also desirable. The longitudinal expansion can be accomplished in many ways. For example, it can be performed by placing the sleeve over a split telescoping, Teflon-coated mandrel so that its center is over the split second of the mandrel. The sleeve is then heated to its recovery temperature whereupon it recovers over the mandrel, the mandrel being provided with a diameter considerably greater than the recovered diameter of the tubing. While the sleeve is still in the melt, the split mandrel is forcibly separated causing the sleeve to be longitudinally expanded. As a result of the longitudinal expansion, the diameter in the central portion 12 is reduced as is the wall thickness of the sleeve in the central area. If desired, longitudinal expansion can be accomplished without a change in diameter, only the wall thickness being changed. If rotational shrinkage is desired as well as longitudinal shrinkage, each end of the mandrel may be rotated 90° as the two parts of the mandrel are separated longitudinally. This results in a 180° twisted sleeve. The sleeve is allowed to cool while the mandrel is in its extended position and the mandrel is then removed.

FIG. 3 shows an actuator incorporating the expanded sleeve 10 of FIG. 2. Besides the sleeve 10, the actuator comprises a first member 14 having a contact tip 16 having a rounded face and a second member 18 having similarly rounded contact tip 20. The faces may be flat or irregular if desired. The member 14 has a peripheral groove 22 formed therein while the member 18 is provided with a similar peripheral groove 24. The portions of the sleeve 10 overlying the grooves 22 and 24 are heated to above the recovery temperature of the material of the sleeve 10 so that these portions recover into the grooves 22 and 24, to firmly engage the members 14 and 18. The grooves may be deleted if desired as the gripping action of the sleeve is sufficient to firmly hold the members 14 and 18. The actuator is now ready for use.

When the entirety of the sleeve 10, and particularly the central portion 12 thereof, is heated to above its recovery temperature, the sleeve attempts to shrink both longitudinally and diametrically, and also rotationally if it was frozen in the twisted condition. As a result, the members 14 and 18 are moved toward each other until the faces of the contact tips 16 and 20 engage. In order that the engaging force be maximized, it is desirable that the members 14 and 18 initially be spaced apart in the sleeve 10 by a distance less than the distance the sleeve 10 was longitudinally expanded. Preferably, approximately 25% unresolved recovery is left to insure the best possible engagement of the tips 16 and 20, or, in other words, the initial spacing between the members 14 and 18 does not exceed approximately 75% of the longitudinal expansion.

In many instances it is desirable that the contact tips 16 and 18 be ground or wiped against each other as well as forced together. This wiping action is particularly useful, if not necessary, when the members 14 and 18 are electrical contacts being engaged to complete an electrical circuit. As is known, this wiping engagement provides a cleaning action of the mating contact surfaces which significantly reduces the contact resistance. When such a wiping contact is desired, the sleeve is provided with the rotational expansion previously described. When a sleeve so expanded recovers, it will rotate in the opposite direction toward its original configuration with the result that the contact tips 16 and 18 are wiped against each other as they are forced into abutment by the longitudinal shrinkage. Of course, the amount of unresolved recovery and the initial positioning of the members 14 and 18 within the sleeve 10 are very important when this dual recovery is utilized as the relationship of the two types of recovery must be such that the contact tips engage and are being forced together during at least a portion of the rotational recovery.

The many uses of an actuator such as that just described should be obvious to those skilled in the art. For example, one of the members 14 or 18 could be one of a plurality of terminals on a terminal block to which a plurality of electrical conductors must be connected, either selectively or simultaneously. One end of the sleeve 10 is slipped over the other member which is suitably connected to the end of the conductor. The sleeve is then partially recovered to the extent shown in FIG. 3. After all of the sleeves have been installed to this extent, the simultaneous application of heat causes all of the contacts to be made, or a selective application of heat causes one or more of them to be made. In the event that a contact is made that is later discovered to be undesirable, the particular sleeve can again be heated to above its recovery temperature and longitudinally expanded to break the contact. One great advantage of this contacting system over many of those presently in use is that the contacts are neuter. The elimination of the need for different male and female contacts can result in a significant reduction of inventory and a consequent cost saving.

FIG. 5 shows another actuator according to the present invention that is particularly useful in making electrical connections. In this figure, a sleeve 30 is provided that is similar to the longitudinally and/or rotationally expanded sleeve 10. A first contact member 32 is provided with a peripheral ridge 34 and has a concave depression 36 in its tip. The cooperating contact member 38 has a peripheral ridge 40 and a conical tip 42. Preferably, the conical tip 42 has a greater included angle than the concave depression 36, for example, the conical tip 42 may have an included angle of 60° and the depression 36 an included angle of 45°.

After the members 32 and 38 are inserted into the sleeve 30, the sleeve is partially recovered around these members and around the ridges 34 and 40 so that the members 32 and 38 are firmly engaged by the sleeve. Of course, grooves such as those shown in FIGS. 3 and 4 could be substituted for the ridges if desired and vice versa. Upon the application of heat sufficient to raise the sleeve 30 to above its recovery temperature, the members 32 and 38 are forced together to make electrical contact. The conical shape of the tip 42 effectively centers itself in the concave opening 36 making a circular contacting surface. Once again, it is desirable that an unresolved recovery of at least 25% be left to insure good contact. If desired, the sleeve can be rotationally expanded to accomplish the wiping or cleaning function described previously.

FIGS. 6 and 7 show another embodiment of the actuator of the present invention. In FIG. 6, a sleeve 50 similar to the sleeves 10 and 30 has been longitudinally expanded in the manner previously described. Inserted within the sleeve 50 is a first hollow tubular member 52 having a peripheral ridge 54. A plastic sleeve 56 is force fitted into the tubular member 52 or otherwise firmly attached thereto. A solid contact member 58 is then firmly positioned in the member 52 so that it makes good electrical contact with the member 52. The sleeve 56 receives the elongated contact tip 60 of a member 62 which is inserted in the other end of the sleeve 50 and which is provided with a peripheral ridge 64. As was the case in the previous embodiment, the sleeve 50 is partially recovered until it firmly engages the members 52 and 62 and the ridges 54 and 64.

The actuator thus described is of a construction that is particularly useful where the degree of longitudinal movement is relatively large. In such a situation, it is desirable to have some sort of guiding means for assuring that the parts to be brought together will engage properly. In the embodiment illustrated, the sleeve 56 and elongated tip 60 serve this purpose. When the sleeve 50 is recovered, as shown in FIG. 7, the member 62 and the tubular member 52 are moved together until the leading end of the contact tip 60 of the member 62 abuts against the inner surface of the contact member 58. If the actuator is used only for mechanical purposes and no sudden electrical contact is to be made between the members 58 and 60, the sleeve 56 could be constructed of metal. In such a case the member 58 could even be deleted so that recovery would continue until the shoulder 66 of the member 62 abutted against the end of the sleeve 56.

It should be obvious, of course, that other types and configurations of guides could be provided for the same purpose. One of the members of the actuator illustrated could, for example, be used to open or close a valve upon application of heat to the sleeve. If desired, a rotational force could be exerted on an external member by rotationally expanding the sleeve. In order to maximize the transmission of these rotational forces, the members 52 and 62 may be provided with longitudinal grooves or ridges to insure engagement between the sleeve and these members. This improved engagement could also be provided by forming longitudinal grooves or notches in the peripheral ridges 54 and 64. These steps, of course, could also be taken with the other embodiments. As is apparent from the foregoing, the two members to be relatively moved may be initially completely physically separated within the recoverable sleeve, or they may have portions which are engaged, for example, for guiding purposes. Consequently, the term "spaced" as used in the present specification is meant to include both these conditions and to indicate only that the members are capable of moving relative to each other in the direction of heat recovery of the recoverable sleeve.

What is claimed is:

1. A heat recoverable article comprising a longitudinally expanded heat recoverable member, and first and second contact members positioned in said heat recoverable member, said contact members being spaced from each other but engaged and permanently held by said heat recoverable member, and positioned so that the longitudinal recovery of said heat recoverable member causes said contact members to be moved toward one another.

2. The article of claim 1 wherein said heat recoverable member comprises a heat recoverable metal.

3. The article of claim 1 wherein said heat recoverable member is also rotationally expanded.

4. The article of claim 3, wherein said spacing between said contact members before heat recovery of said heat recoverable member is less than said change in longitudinal dimension.

5. The article of claim 1 wherein said first contact member has a conical tip and said second contact member has a concave depression therein for receiving said conical tip upon recovery of said heat recoverable member whereby a circular contacting surface is formed between said contact members.

6. The article of claim 5 wherein said conical tip includes a greater angle than does said concave depression.

7. The article of claim 6 wherein said conical tip includes an angle of approximately 60° and said depression includes an angle of approximately 45°.

8. The article of claim 1 wherein said first contact member includes guide means for guiding movement of said second contact member upon recovery of said heat recoverable member.

9. The article of claim 1, wherein said spacing between said contact members before heat recovery of said recoverable member is less than said change in longitudinal dimension.

10. A heat recoverable article comprising a sleeve of material which has been dimensionally changed in both the diametric and longitudinal directions from an original heat stable form to an independently dimensionally heat unstable material capable of moving in the directions of its original form upon the application of heat alone, a first contact member positioned within said sleeve and permanently held thereby, a second contact member positioned within said sleeve and permanently held thereby, said second contact member being longitudinally spaced from said first contact member, and positioned so that said sleeve acting upon heat recovery thereof forces said contact members into engagement.

11. The article of claim 10 wherein said sleeve comprises a heat recoverable metal.

12. The article of claim 10 wherein said spacing between said contact members before heat recovery of said sleeve is less than said change in longitudinal dimension.

13. The article of claim 12 wherein said spacing is less than approximately 75% of said longitudinal change in dimension.

14. The article of claim 12 wherein each of said contact members has an inner rounded surface, said rounded surfaces being brought into abutment by recovery of said sleeve.

15. The article of claim 12 wherein said first contact member has a conical tip and said second contact member has a concave depression therein for receiving said conical tip upon recovery of said heat recoverable member whereby a circular contacting surface is formed between said contact members.

16. The article of claim 15 wherein said conical tip includes a greater angle than does said concave depression.

17. The article of claim 16 wherein said conical tip includes an angle of approximately 60° and said depression includes an angle of approximately 45°.

18. The article of claim 12 wherein said first contact member includes guide means for guiding movement of said second contact member upon recovery of said heat recoverable member.

19. A heat recoverable article comprising a sleeve of material which has been dimensionally changed in the diametric, longitudinal and rotational directions from an original heat stable form to be independently dimensionally heat unstable material capable of moving in the directions of its original form upon the application of heat alone, a first contact member positioned within said sleeve and permanently held thereby, a second contact member positioned within said sleeve and permanently held thereby said second contact member being longitudinally spaced from said first contact member, and positioned so that said sleeve acting upon heat recovery thereof forces said contact members into engagement and rotated relative to each other while in engagement.

20. The article of claim 19 wherein said sleeve comprises a heat recoverable metal.

21. The article of claim 19 wherein said spacing between said contact members before heat recovery of said sleeve is less than said change in longitudinal dimension.

22. The article of claim 21 wherein said spacing is less than approximately 75% of said longitudinal change in dimension.

References Cited

UNITED STATES PATENTS

| | | |
|---|---|---|
| 2,992,457 | 7/1961 | Harrison. |
| 3,127,760 | 4/1964 | Kirkpatrick et al. |
| 3,243,211 | 3/1966 | Wetmore _____ 174—84 XR |
| 3,294,941 | 12/1966 | Mullen. |

DARRELL L. CLAY, Primary Examiner

U.S. Cl. X.R.

339—393; 174—84